United States Patent [19]
Chiu et al.

[11] Patent Number: 6,035,121
[45] Date of Patent: Mar. 7, 2000

[54] METHOD AND SYSTEM FOR LOCALIZING A COMPUTER PROGRAM

[75] Inventors: Render Chiu, Campbell; Benito Infantino, Mountain View, both of Calif.

[73] Assignee: Netscape Communication Corporation, Mountain View, Calif.

[21] Appl. No.: 08/888,859

[22] Filed: Jul. 7, 1997

[51] Int. Cl.[7] .................................................. G06F 9/45
[52] U.S. Cl. .......................................... 395/705; 395/709
[58] Field of Search ..................................... 395/705, 709; 704/8, 1, 7; 707/536; 345/334

[56] References Cited

U.S. PATENT DOCUMENTS

| | | | |
|---|---|---|---|
| 4,706,212 | 11/1987 | Toma ........................................... | 704/2 |
| 4,731,735 | 3/1988 | Borgendale et al. ........................ | 707/4 |
| 4,870,610 | 9/1989 | Belfer ......................................... | 704/2 |
| 4,916,614 | 4/1990 | Kaji et al. ................................... | 704/2 |
| 4,953,088 | 8/1990 | Suzuki et al. ............................... | 704/3 |
| 5,579,223 | 11/1996 | Raman ........................................ | 704/1 |
| 5,583,761 | 12/1996 | Chou ......................................... | 707/536 |
| 5,664,206 | 9/1997 | Murow et al. .............................. | 704/8 |
| 5,724,593 | 3/1998 | Hargrave, III et al. .................... | 704/7 |
| 5,848,274 | 12/1998 | Hamby et al. ............................. | 395/705 |
| 5,907,326 | 5/1999 | Atkin et al. ............................... | 345/334 |

OTHER PUBLICATIONS

Windows Developer Spelling Checker, Newsbytes, Jul. 1996.

Discover's O.K. Tax Deal, Credit Card Management, p. 10, Apr. 1995.

The Internet: Top to Bottom, Network Computing, p. 46, May 1996.

INFORMIX: INFORMIX Announces INFORMIX–NEW-ERA v. 2.0, M2 Presswire, Jul. 1995.

*Primary Examiner*—Tariq R. Hafiz
*Assistant Examiner*—Antony Nguyen-Ba
*Attorney, Agent, or Firm*—Michael A. Glenn; Kirk D. Wong

[57] ABSTRACT

A method and system are provided for converting a computer program from a current version first language to a localized version in a target language. All resource information of the program is stored in a resource dynamic link library (DLL). A current version resource DLL is separated from executable code and compared by a leverage tool to resource DLLs of a previous version of the computer program and to a previous target language translation. The leverage tool stores all resource data from the current version resource DLL as translation records in a resource database. The translation records may include translation instructions and comments. Strings in the current version resource DLL that were present in the previous version, and already translated in the previous target language resource DLL are stored in a new target language resource DLL. Strings which are not to be translated to the target language are locked. In the preferred embodiment, the new target language resource DLL and resource database are distributed to a localization vendor for translation. A translation tool allows a translator to translate the resource database to the target language. Locked strings are not translated and the already-translated strings are re-used.

13 Claims, 6 Drawing Sheets

METHOD AND SYSTEM FOR LOCALIZING A COMPUTER PROGRAM

BACKGROUND OF THE INVENTION

1. Technical Field

The invention relates to the writing and marketing of computer software. More particularly, the invention relates to a method and system for localizing computer software.

2. Description of the Prior Art

Computer systems and other programmed devices are now being used throughout the world. While hardware configurations are similar in most venues (e.g. due to universal power supplies) software can and must vary significantly from country to country. Such variances result from differences in language and/or custom, such as between English and Swedish. For example, English menus and dialog boxes in a computer program must be translated into a Swedish language version of a software program before the program can attain any measure of acceptance and success in the Swedish market.

Variances also result from alphabet or character differences. An English language computer program must be modified to address the requirements of a ideographic based language, such as Chinese or Japanese.

The differences inherent to such translations can significantly affect the appearance and functioning of a translated computer program. For example, a translated word may not fit within the confines of a dialog box configured for English.

Other software differences result from differing laws and standards. For example, the United States restricts the encryption capabilities of exported software. Thus, the encryption standard for a domestic computer program may exceed the standard for the foreign language version of the same computer program.

Globally competitive software companies provide versions of a computer program that are compatible with the requirements of each country in which the application is marketed. Any delays in providing a compatible version of the program can reduce the market share for the application in that particular country. It is therefore of critical importance to translate, or "localize" a computer program quickly and in the most economical and efficient way.

All versions of the computer program may be released on the same date, or versions may be consecutively released. If a software company wishes to release all versions of the application at the same time, a delay in one translation postpones the release date. This can affect the program's international market share. If one version is released first, a translation delay after the initial release date may give competitors the opportunity to respond by improving their products.

Several software translation methods are known in the prior art. In one method, text editors or text-based tools are used for translation. A localization kit containing the program to be translated, and notes regarding the translation, is distributed to a localization vendor. The localization vendor then distributes the application and notes to a translator.

The translator relies on the localization kit notes to translate the program. Therefore, text-based localization relies on the localization kit as the communications tool between the software engineers/programmers and software vendors.

However, this method is subject to translation errors. It is difficult to prepare documentation and notes to track and guide the translator to properly translate documents. Errors resulting from miscommunication, and the quality control time required to correct these errors can significantly delay the release date of the translated version of the computer program. Additionally, in this method, each language version as well as each subsequent release version of a computer program is translated separately, without reference to any previous translations. This process can result in inconsistencies among the versions.

Another text-based method involves the identification and translation of text resources. Resources include data such as strings, buttons, the style of bus, icons, fonts, menus, and dialog boxes. In this method, text resources are translated and the entire computer program is then re-compiled. Thus, a resource text file, such as the Microsoft Windows .RC file, is manually translated to change such features as, windows, dialog boxes, and menus.

However, there are difficulties associated with translating such resource text file. For example, resources are typically hidden in a Microsoft Windows .RC file. It is therefore difficult for the translator to locate strings for translation. This can cause errors in the text translation. To compensate for such errors, the translator may over-translate the text file. Thus, text which should not or need not be translated is often translated, with detrimental results.

In yet another prior art translation method, the translator relies on the localization kit as the only source for identifying which resources need to be localized. However, it is difficult to re-use information from a previous release version or other foreign language version localization kit. Thus, such text-based localization kit must generally be developed independently for each language or release version of a program. This increases engineering efforts and costs.

The prior art text-based localization methods all require the binary code of the computer program to be re-compiled. For example, the translator of a resource text file must re-compile the .RC file and retest the application for each change. Furthermore, the compiled text translation may affect the functioning of the application. For example, in an English to Japanese translation, characters and buttons may be displaced on the screen. The re-compiled binary code must therefore be retested completely for even minor changes to insure that it functions correctly. This adds considerably to the time and cost required to produce a local version of the program.

It would therefore be an advantage to provide a method and system for rapidly localizing a computer program. It would be a further advantage if such system reduced, if not entirely eliminated, problems associated with over-translation.

SUMMARY OF THE INVENTION

The invention provides a method and system for localizing a computer program. The invention is readily adapted for use with different types of software applications, for example Web browsers.

In the invention, computer program is written such that all resource information is stored in a resource dynamic link library (DLL). To translate the application, the resource DLL of the current version of the program is first separated from the executable code.

The current version resource DLL is then compared by a leverage tool to the resource DLL of a previous version of the program in the first language version, e.g. English. This previous version of the program may be a beta version. The current version resource DLL is also compared to the resource DLL of any translation of the previous version of the program from the first language to the target language. Notes and comments from the translation of the previous version of the program may be displayed by the leverage tool, if desired.

The leverage tool generates a new target language resource DLL. The new target language resource DLL stores those strings of the current version resource DLL that were also present in the previous version, and that were previously translated. All resource data from the current version resource DLL are stored as translation records in a resource database. These translation records include translation instructions and comments. Strings which are not to be translated to the target language are locked.

In the preferred embodiment of the invention, the new target language resource DLL and resource database are distributed to a localization vendor for translation. A translation tool allows a translator to translate the contents of the resource database to the target language. Locked strings are not translated and the already-translated strings are re-used. The new version of the program is thereby readily localized to the target language with minimal time and effort. In the preferred embodiment of the invention, the translation tool is adapted for use by engineers and/or programmers, vendors, and translators.

DETAILED DESCRIPTION OF THE INVENTION

The invention provides a method and system for localizing a current version of a computer program from a first human language to a target language, e.g. Japanese. All resource information for each version of the program is located in a resource dynamic link library (DLL). The resource DLL of the current version of the program is separated from the executable code of the program. Resource DLLs of any previous versions and translations of the program are then processed to re-use those strings of the current version that have already been translated.

As a result, a translator is needed only to translate the new strings from the current version. The software application is not re-compiled. Rather, a new resource DLL is generated and joined to the executable code to localize the current version of the program to the target language. The costs of the prior art localization methods, and the problems associated therewith are thereby reduced, if not entirely eliminated. Thus, the invention permits simultaneous release of international versions of the program.

The invention provides a common user interface for localization vendors to use. Inconsistencies among the various foreign language and release versions of a program are thereby reduced. Translators are provided with an open environment that permits the translator to select and use any appropriate supported translation programs or word processors. The translation is then imported back to the translation tool.

Programs, such as Microsoft Corporation's Windows and IBM's OS/2, provide various services to programs via dynamic link libraries. DLLs are used to link and share system functionality. Programs may include their own DLLs, or may access DLLs associated with other programs, such as those provided by an operating system. A DLL contains executable code or data. DLLs that contain only data, such as strings, buttons, the style of bus, icons, fonts, menus, and dialog boxes, are referred to as "resource DLLs."

Figure 1:
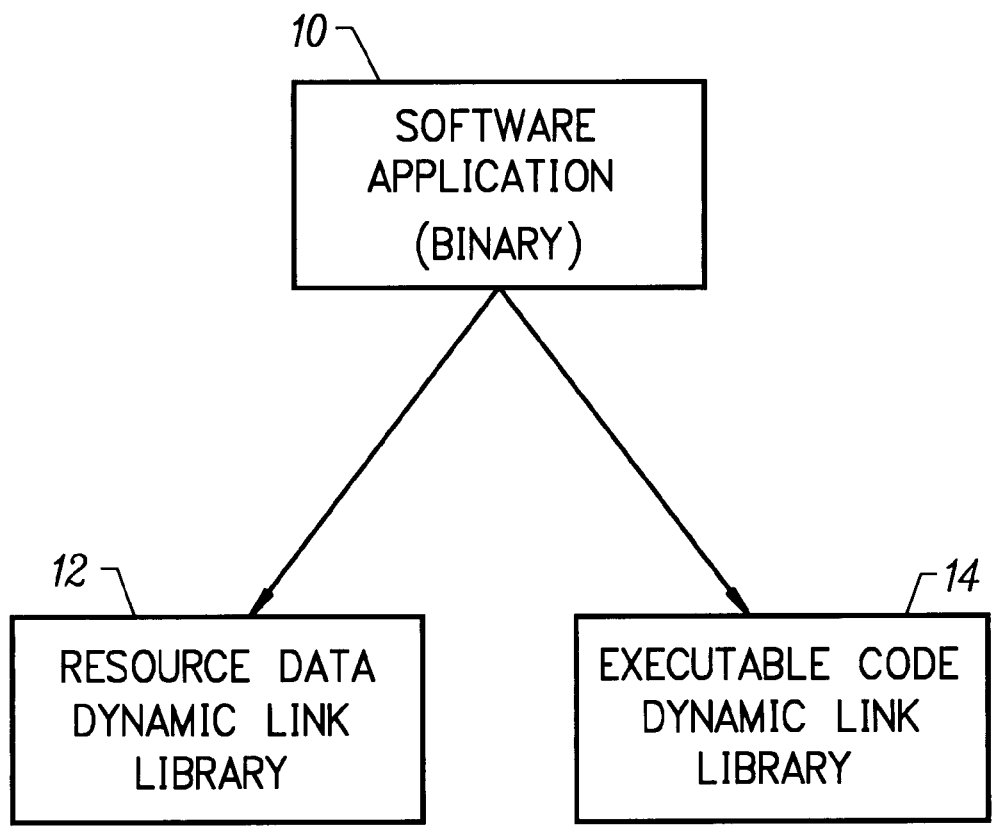
FIG. 1 is a block schematic diagram of a computer program structure according to the invention.

FIG. 1 is a diagram of a computer program structure according to the invention. In the preferred embodiment of the invention, all of the resource data for the program 10 is written as a separable binary module within the program. The separable binary module is the resource DLL 12 of the program. The executable object code is located in at least one other dynamic link library 14. The program is readily written by one skilled in the art using well-known programming techniques. The invention uses the separable binary module to advantage to localize a current version of a program from a first language version, such as U.S. English to a target language version, such as Japanese.

For the purposes of example, the current version of the program is a United States version, and the first language is U.S. English. However, the invention is readily adapted for use in localizing an application to and from any human languages. Thus, the use of English as the first language is for exemplary purposes only, and is not meant to be a limitation upon the scope of the invention.

Figure 2:
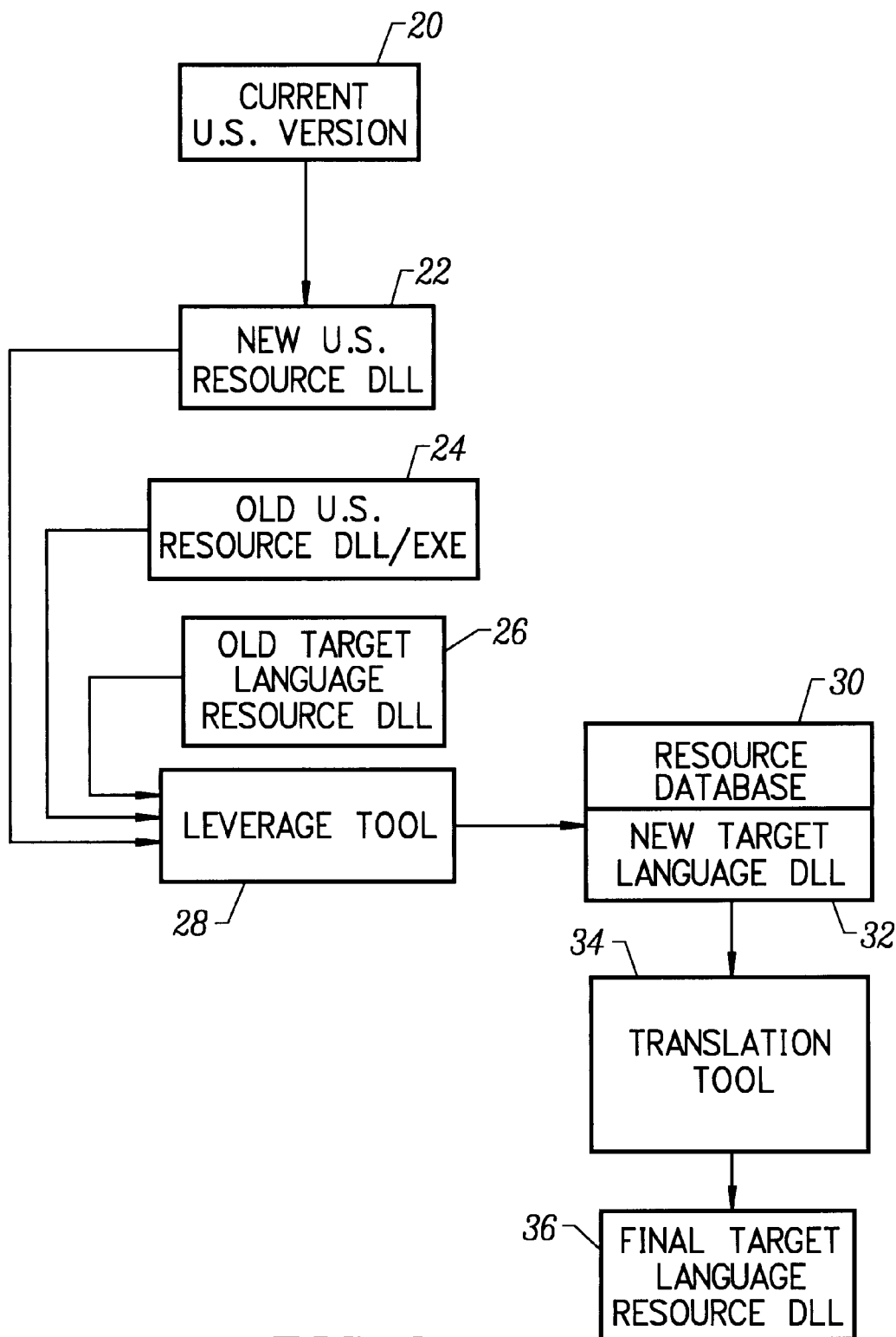
FIG. 2 is a flow chart of a system for localizing a computer program according to the invention.

FIG. 2 is a flow chart of a system for localizing a program, according to the invention. In FIG. 2, the current U.S. version of the program 20 is translated to a target language. A leverage tool 28 [A block diagram showing operation of the leverage tool would be helpful] separates the current version resource DLL 22 from the executable code of the current U.S. version.

The resource DLL 24 of a previous version of the program is also retrieved by the leverage tool. This previous version may be a beta version or an officially-released version of the program. If the previous version has been translated to the target language, then the previous version target language resource DLL 26 is also acquired.

The leverage tool 28 compares the current version DLL 22 to the previous version 24 and the previous target language 26 resource DLLs. Strings in the current version resource DLL that were in the previous version and that were translated to the target language are extracted from the previous version and previous target language resource DLLs.

The leverage tool includes a module for creating the directory structure for a build environment. Thus, when a user selects a working directory, the leverage tool automatically creates sub-directories for the files used in the leverage process. For example, such sub-directories include those for the current version, the previous version, the previous target language, the new target language, and the final target language resource DLLs, as well as those for resource database storage and version control backups.

The leverage tool also includes a module for building and leveraging the resource dynamic link library. The preferred embodiment of the invention includes a graphical user interface (GUI) that allows the user to drag and drop files into a working space. A button is provided to build the new target language DLL. Buttons are also provided to work on the resource database and to exit the leverage tool. These buttons may be included as selections in a menu bar.

The GUI may be provided in any configuration that permits the user to perform the functions of the leverage tool. Such configuration may include, but is not limited to, dialog boxes, buttons, menu bars, and display windows.

The leverage tool produces a new target language resource DLL 32 containing the already-translated strings leveraged from the current version, previous version, and previous target language DLLs. A resource database 30 is also generated by the leveraging tool. The resource database contains all of the resource strings of the current version resource DLL constructed as translation records (described below.) A backup text file may be stored for later use, for example, to confirm the version of an application.

The resource database is constructed as translation records. In the preferred embodiment of the invention, each translation records contains one or more of the following fields:

Translation Flag

Resource ID

U.S. String

Target Language translation field

"To Vendors"

"From Vendors"

Comments

Check Box

A "Translation Flag" indicates whether or not a field should be translated. For example, a "Y" indicates that this string needs to be translated and "N" indicates that a translation is not necessary. In the preferred embodiment of the invention, only system administrators are allowed to change this field.

A "Resource ID" field contains the same ID as in the current version resource DLL.

The "To Vendors" field allows the engineers, programmers, or administrators to input special comments to vendors.

The "From Vendors" field allows the vendors to input their comments.

Additional comments or information are included in the "Comments" field. The "Check Box" allows the translator to indicate if a string has been translated.

The translator is provided with specific information for each resource thereby reducing translation errors. The translator is also prevented from accessing resources that should not be translated. This avoids over translation that can cause errors in program functionality.

At the end of the leveraging process, key words regarding the leveraging are generated and displayed for each string. The key words generated in the preferred embodiment of the invention include those listed in Table 1.

TABLE 1

??? - Uncertain leverage. This string should be manually checked by the engineers or vendors to determine if it should be translated. For example, (&File vs. F&ile).
EXACT MATCH - The string has not been changed from the previous version. In this case, the Translation Flag is marked "N".
ID ONLY - Only the string ID has matched.
STRING ONLY - Only the string has matched.

TABLE 1-continued

NO MATCH - This is a new string.

The resource database may use any format supported by the invention as well as by the vendors and translators hardware and software. In the preferred embodiment of the invention, the resource database is constructed in dBase format.

The resource database contains two parts. The first part is the binary code of the database generated by the leverage tool, for example in the dBase format. The second part of the resource database in the text format of the database generated by the leverage tool. An example of the text format of the database is shown in Table 2.

TABLE 2

Translation Flag: Y
    US String: This is a test
Translated String:
    Resource ID: IDD_TEST
        ToVendor: Do what you have to do
        FromVendor: What do you mean by that
        Comments:
            Done:    []        // Check box to indicate translation done In the preferred embodiment of the invention, the resource database and new target language resource DLL are distributed to localization vendors and translators. The localization vendors and translators use a translation tool 34 [A Block diagram showing operation of the translation tool would be helpful] to produce a final resource DLL 36 in the target language. In an alternate embodiment, the localization and translation is performed in situ and the translated program is then distributed.

Figure 3:
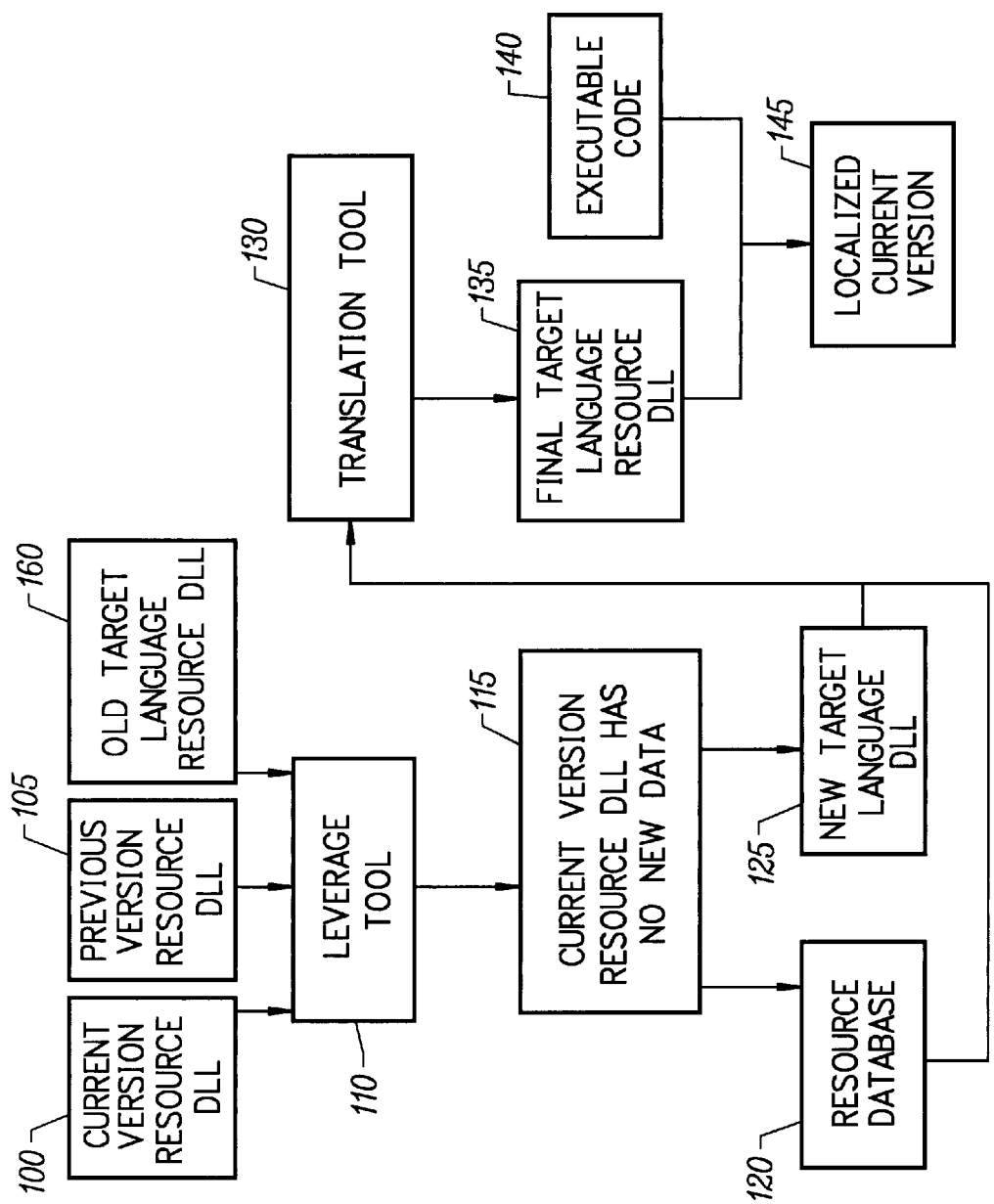
FIG. 3 is a flow chart illustrating a first example of leveraging according to the invention.

FIG. 3 is a flow chart illustrating a first example of leveraging according to the invention. The current version resource DLL 100, previous version resource DLL 105, and previous target language resource DLL 160 are compared by the leverage tool 110. In the example, the current version resource DLL has no new data 115 from the previous version. The new target language DLL 125 generated by the leverage tool therefore contains the previous target language resource DLL. The resource database 120 contains the current version resource DLL 100 with Translation Flags for each string indicating that no translation is to be done.

The translation tool 120 is supplied with the resource database and the new target language DLL. Upon translation, the final target language DLL 135 is rejoined to the executable code 140 to provide the localized current version 145 of the program.

Figure 4:
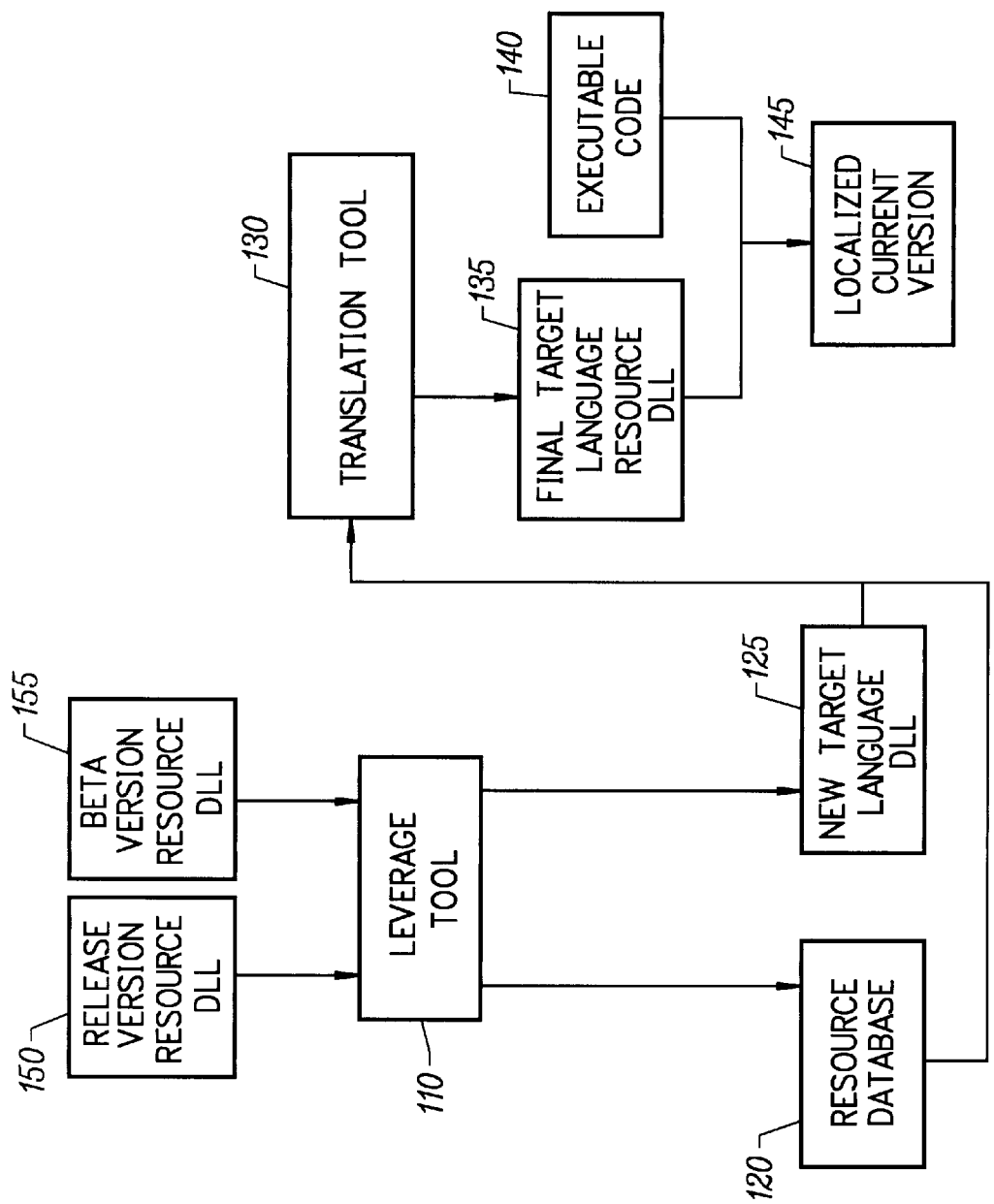
FIG. 4 is a flow chart illustrating a second example of leveraging according to the invention.

FIG. 4 is a flow chart illustrating a second example of leveraging according to the invention. In this example, there is no previous version of the program. The release version resource DLL 150 is compared to the beta version resource DLL 155 by the leverage tool.

Figure 5:
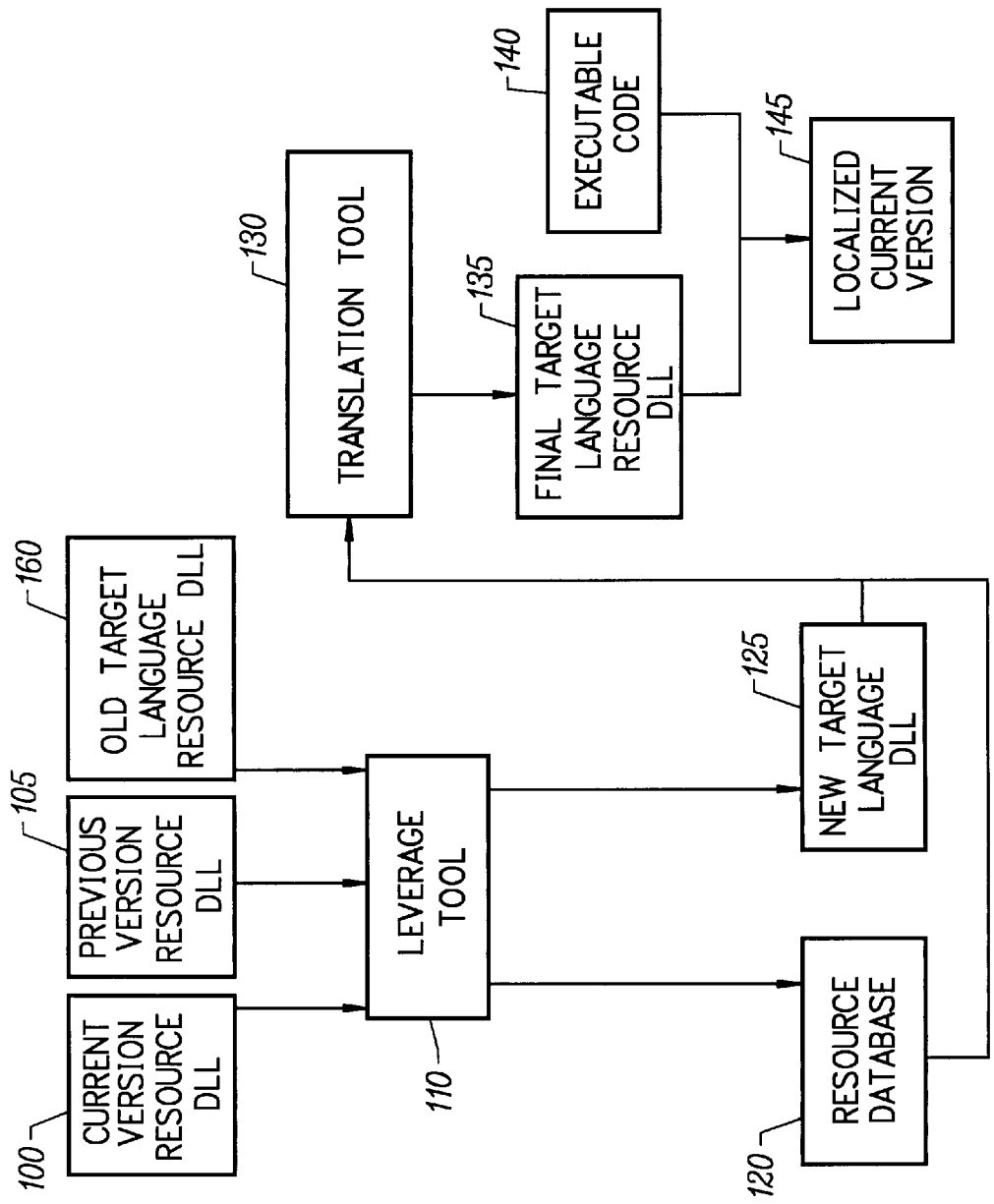
FIG. 5 is a flow chart illustrating a third example of leveraging according to the invention.

FIG. 5 is a flow chart illustrating a third example of leveraging according to the invention. In the FIG. 5, the current version resource DLL 100 is compared to both the previous version resource DLL 105 and the previous target language resource DLL 160. The resource database 120 contains all of the resource strings of the current version resource DLL. The new target language resource DLL 125 contains the already-translated strings leveraged from the current version, previous version, and previous target language DLLs.

The translation tool takes the resource database generated by the leverage tool and allows the user to translate its contents to the target language. In the preferred embodiment of the invention, the translation tool is adapted for use by engineers and/or programmers, vendors, and translators. Engineers and programmers may use the translation tool to input comments and to verify translation information that is sent back from vendors. Cross platform strings may also be added or deleted.

Vendors may use the translation tool to communicate to the translator and engineers, and to verify the translation results from the translator. The translator may use the translation tool to translate the resource database to the target language based upon instructions provided in the tool. The translated resource database may then be saved as the final target language resource DLL file.

In the preferred embodiment of the invention, translators are provided with an open environment so that they can use the tool they are most familiar with for the translation. The translation is then imported back to the translation tool. Thus, the translator can use, for example, a word processor, and export the translated file back to the translation tool.

In the preferred embodiment of the invention, the translation tool has separate operation modes for administrators and for end-users. The administration mode, for example, may provide full access to the translation tool. Password protection may be implemented. The administration mode provides protection to the database and allows the translator to work only on those fields that the administrator opens for access. Alternate embodiments of the invention may provide additional modes of operation. For example, a separate mode may be provide for vendors.

In the end-user mode, the translator views and edits certain fields in the resource database. Controls in the translation tool GUI permit the end-user to navigate only the fields opened for access by the administrator. In the preferred embodiment of the invention, the translation tool GUI presents two views. The "Full View" is a table view which allows the user to view the entire database. The "Record View" uses a dialog box to display one record at a time.

Figure 6:
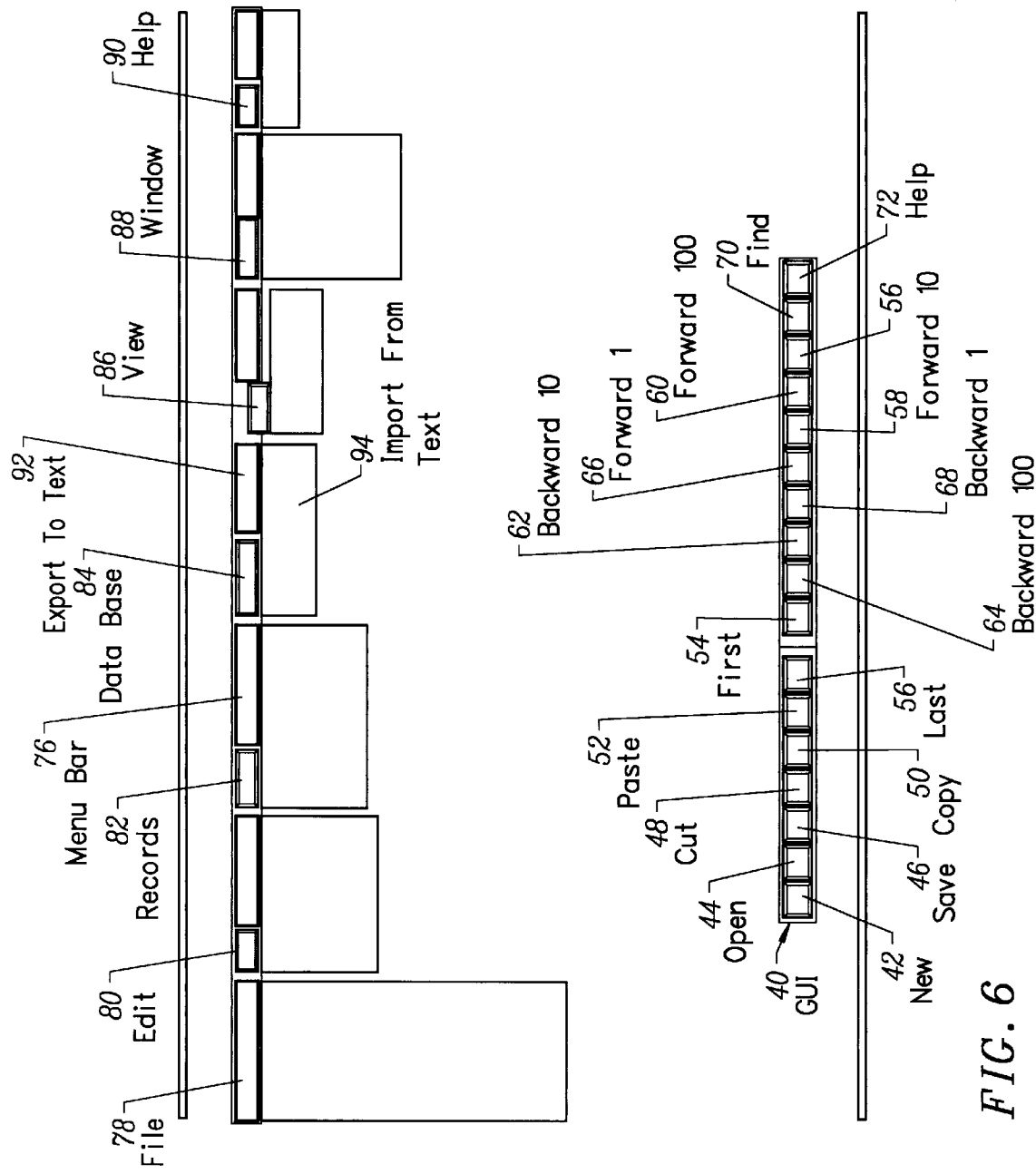
FIG. 6 is a front view of a graphic user interface for a translation tool according to the preferred embodiment of the invention.

FIG. 6 is a front view of a GUI that is adapted for use with the translation tool GUI, according to the preferred embodiment of the invention. The GUI 40 displays a toolbar showing selectable buttons.

The "New" button 42 opens a new DLL or database file (DBF format). The "Open" button 44 displays the Open dialog box for opening an existing DLL or database file. The "Save" button 46 opens a "Save As . . . " dialog box and saves changes made to the active DLL or database file. The "Cut" button 48 deletes the selection and places it in the clipboard. The "Copy" button 50 copies the selection and places it in the clipboard. The "Paste" button 52 pastes the contents of the clipboard into the selection. In the preferred embodiment of the invention, this function is only enabled in the "localized String" field. Control buttons permit the user to navigate among the records. For example, control buttons may be provided to permit the user to move to the first 54 or last 56 records, to move forwards 58, 60 and backwards 62, 64 ten or one hundred records at a time, or to move one record at a time forwards 66 or backwards 68. The "Find" button 70 opens the Find dialog box. Selecting Find executes a full search that allows the user to search text such as stringID or contents. The "Help" button 72 accesses a help database for assisting the user.

In the preferred embodiment, an end-user is only able to view the records marked "Y" in the Translation Field. All other records are for engineering and vendor use. However, the proper password may be provided, for example, to the translator to allow records to be added or deleted.

When a file is opened, the Main Window 74 displays information such as that included in Table 3.

TABLE 3

| | |
|---|---|
| File name edit field: | Displays the name of the file currently in use |
| Identifier: | ID for that particular resource |
| Reason: | This field indicates the leverage result |
| US string: | This field displays the string that needs to be localized. This string cannot be edited; translations go in the Localized String field |
| Localized string: | When a file is first opened, this field displays a copy of the resource in the US string edit field. This field can be edited as appropriate for the target language. If the file has been leveraged from a previous translation or if the resource has already been localized, the localized resource is displayed. |
| Translate: | This field is a checkbox. If it is selected, the current record can be translated. If not selected, the translator is not to translate the record. When exported to a text file, this value is either TRUE or FALSE. |

In the preferred embodiment, a Menu Bar 76 contains menu items. The exemplary Menu Bar includes File 78, Edit 80, Record 82, DataBase 84, View 86, Window 88, and Help 90 menus. The DataBase menu includes the items Export to Text 92 and Import from Text 94. The Export to Text item exports the content of a .DBF file to a text file. The Import from Text item imports a translation tool text file into a .DBF file.

The presently preferred file text format for each record is as follows:

| | |
|---|---|
| IDENTIFIER = | STRINGTABLE160 |
| FILENAME = | |
| US STRING = | Your &name: |
| TRANSLATED STRING = | Su &nombre: |
| COMMENTS = | |
| REASON = | |
| TRANSLATE = | TRUE |

The "REASON" field indicates the actions that should be taken to insure a proper translation. For example:

Uncertain Leverage records should be carefully scrutinized.

Exact Match records need not be scrutinized.

String Only records need some checking for context.

No Match means that either the string was not translated before, is a new string, or there is a bug in the leveraging ID ONLY records must be reviewed because this means that the New US string is different from the Old US string, but the leveraging was still done with the ID ONLY warning. The localization engineer should check these strings to insure they still make sense.

As an example, the following two sets of strings are different.

US STRING=var editprivsbuttonlabel="'Edit Privileg'";//YYY\n

TRANSLATED STRING=var logoutallbuttonlabel="'Logout All'";//YYY\n

US STRING=var editprivsbuttonlabel="'Edit Privileges'";//YYY\n

TRANSLATED STRING=var editprivsbuttonlabel="'Edit Privileges'";//YYY\n

These strings should be reverted as they are in the delivery because there is a variable name which has changed and the program may not function properly if the string is translated.

Other cases such as:

Old US STRING=Get Mail

New US STRING=Receive Mail

TRANSLATED STRING=Nachr.abrufen should be left to the judgment of the translator, because it is not obvious to a nonlinguist whether or not the translation should still be the same. Therefore, ID ONLY and STRING ONLY matches should be reviewed by both the localization engineer and the translator.

The invention is readily adapted for use in translating to and from any languages. Thus, the names of the buttons, field names (such as US string), and menu items may be varied appropriately. The invention eliminates the need to re-compile the program upon translation. This significantly reduces translation time and errors when compared to the prior art methods. Further, invention may be used with all types of programs. in a preferred embodiment of the invention, the program is a Web browser, such as Netscape Navigator or Communicator, manufactured by Netscape Communications Corporation of Mountain View, Calif.

Although the invention is described herein with reference to the preferred embodiment, one skilled in the art will readily appreciate that other applications may be substituted for those set forth herein without departing from the spirit and scope of the present invention. For example, the resource data for the program may be located in more than one resource DLL. In this embodiment, the leverage tool compares the contents of comparable resource DLLs of the current and previous version of the program. Thus, if font data are stored in a first resource DLL and dialog box data is stored in a second, the leverage tool compares all first resource DLLs with each other, and separately compares all second resource DLLs.

Additionally, the invention may also be adapted for use with computer programs that store resource data within files having an ".exe" extension. The .exe extension is used by some operating systems to denote an executable binary file. DLLs may have no extension or extensions including .exe, .dll, .drv, or .fon. Such applications include versions of browser applications developed by Netscape Communications Corporation.

In an alternate embodiment of the invention, the translation tool may be used to edit the translation manually, for example, to add a new feature that is not found in the current U.S. version. Thus, a "bug" detected in the current U.S. version may be corrected immediately in the translated version, without first waiting for the U.S. correction to be implemented.

Finally, a DBM file may be used as the cross platform string database. The translation tool uses DBM API to generate the database for translation. Accordingly, the invention should only be limited by the claims included below.

We claim:

1. A method for converting a computer program from a current version in a first language to a localized version in a target language, comprising the steps of:

providing a current version resource dynamic link library;

providing a resource dynamic link library of a previous version of said computer program in the first language;

providing a resource dynamic link library of a translation from said first language to said target language of the previous version;

comparing said current version resource dynamic link library to said previous version first language and target language resource dynamic link libraries to extract strings in said current version resource dynamic link library that have previously been translated in said previous version; and using said extracted strings during conversion of said current version to said target language.

2. The method of claim 1, wherein said comparing step comprises the steps of:

generating a resource database containing all of the strings of said current version resource DLL constructed as translation records; and generating a new target language resource dynamic link library containing said previously-translated strings.

3. The method of claim 1, further comprising the step of:

using a translation tool to identify strings in said resource database and new target language resource dynamic link library which are to be translated to said target language and to lock strings which are not to be translated to said target language.

4. The method of claim 3, further comprising the step of:

translating the strings which are to be translated from said first language to said target language; wherein said current version of said computer program is localized to the target language.

5. The method of claim 3, further comprising the step of:

displaying comments from a translation of said previous version of said computer program with said translation tool.

6. The method of claim 3, further comprising the step of:

indicating an extraction result for a string with said translation tool.

7. A method for converting a computer program from a current version in a first language to a localized version in a target language, comprising the steps of:

providing a current version resource dynamic link library;

providing a resource dynamic link library of a previous version of said computer program in said first language;

providing a resource dynamic link library of a translation from said first language to said target language for said previous version;

comparing said current version resource dynamic link library to said previous version first language and target language resource dynamic link libraries to extract strings from said current version resource dynamic link library that have previously been translated in said previous version;

generating a resource database containing substantially all of said strings of said current version resource DLL constructed as translation records;

generating a new target language resource dynamic link library containing said previously-translated strings;

using a translation tool to identify strings in said resource database and said new target language resource dynamic link library which are to be translated to said target language and to lock strings which are not to be translated to said target language;

translating said strings which are to be translated from said first language to said target language; and using said previously-translated strings in a translation of said current version to said target language;

wherein said current version of said computer program is localized to said target language.

8. The method of claim 7, further comprising the step of:

displaying comments from said translation of said previous version of said computer program with said translation tool.

9. The method of claim 7, further comprising the step of:
indicating an extraction result for a string with said translation tool.

10. A system for converting a computer program from a current version first language to a localized version in a target language, comprising:

a first module for separating a current resource dynamic link library from executable code in said current version of said computer program;

a second module for separating a resource dynamic link library from executable code in a previous version of said computer program in said first language, wherein said second module is optionally provided if a previous version of said computer program is available;

a third module for separating a resource dynamic link library of a translation from said first language to said target language of said previous version of said computer program, wherein said third module is optionally provided if a translation from said first language to said target language of said primary version of said computer program is available;

a leveraging tool for comparing said current resource dynamic link library to said previous version first language and target language dynamic link libraries to generate a resource database containing substantially all of the strings of said current version resource DLL constructed as translation records and a target language resource dynamic link library containing previously-translated strings; and a translation tool for identifying in said resource database and target language resource dynamic link library those strings that are to be translated and for locking strings that are not to be translated;

wherein previously translated strings are used to provide said localized version; and wherein only those strings which need to be translated are translated to generate target language resource dynamic link library.

11. The system of claim 10, wherein the leveraging tool comprises:

a module for creating a directory structure for a build environment; and a module for building and leveraging said resource dynamic link library;

wherein a new target language resource dynamic link library is extracted from the current version, previous version, and translated previous version resource dynamic link libraries.

12. The system of claim 10, wherein said translation tool displays comments from said translation of said previous version of said computer program.

13. The system of claim 10, wherein said translation tool indicates a leverage result for a string.

\* \* \* \* \*